(12) United States Patent
Deenadayal (10) Patent No.: US 10,437,549 B2
(45) Date of Patent: Oct. 8, 2019

(54) SELECTIVE SCREEN SHARING (71) Applicant: VMWARE, INC., Palo Alto, CA (US)

(72) Inventor: Sheetal Deenadayal, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 15/680,242

(22) Filed: Aug. 18, 2017

(65) Prior Publication Data

US 2018/0336373 A1   Nov. 22, 2018

(30) Foreign Application Priority Data

May 19, 2017   (IN) .............................. 201741017639

(51) Int. Cl.
| | | |
|---|---|---|
| *G06F 3/14* | (2006.01) | |
| *G06F 21/84* | (2013.01) | |
| *G06T 5/00* | (2006.01) | |
| *G06F 21/10* | (2013.01) | |
| *G06T 11/60* | (2006.01) | |

(52) U.S. Cl.
CPC ............ *G06F 3/1454* (2013.01); *G06F 21/10* (2013.01); *G06F 21/84* (2013.01); *G06T 5/002* (2013.01); *G06T 11/60* (2013.01); *G06T 2200/24* (2013.01)

(58) Field of Classification Search
CPC .. G06F 3/0482; G06F 3/04842; G06F 3/0481; G06F 3/017; G06F 3/1454; G06F 21/84; G06F 21/10; H04L 65/4076; H04N 21/2187; H04N 21/6125; H04N 21/4316; G06T 5/002; G06T 11/60; G06T 2200/24
See application file for complete search history.

(56) References Cited

U.S. PATENT DOCUMENTS

| | | | | |
|---|---|---|---|---|
| 2010/0194753 | A1* | 8/2010 | Robotham | ................. G06F 3/14 345/428 |
| 2010/0259560 | A1* | 10/2010 | Jakobson | ................. G06F 21/62 345/629 |
| 2012/0011451 | A1* | 1/2012 | Bansal | ...................... H04N 7/15 715/753 |
| 2012/0036452 | A1* | 2/2012 | Coleman | ................. G06F 21/55 715/751 |
| 2013/0007895 | A1* | 1/2013 | Brolley | .................... G06F 21/62 726/28 |
| 2013/0141471 | A1* | 6/2013 | Batson | ..................... G09G 5/00 345/690 |
| 2017/0185368 | A1* | 6/2017 | Handrigan | ............ G06F 3/1454 |
| 2017/0200021 | A1* | 7/2017 | Patel | .................... G06F 21/6245 |

* cited by examiner

*Primary Examiner* — Maurice L. McDowell, Jr.
(74) *Attorney, Agent, or Firm* — Thomas | Horstemeyer, LLP; Arvind R. Reddy; Jason M. Perilla (57) ABSTRACT

Disclosed are various examples for selective screen sharing. In one example, a computing device determines an area to obscure within a video stream using screen-sharing data. The video stream is generated by applying a transformation to a screen capture. The transformation obscures the area within the video stream. The video stream is transmitted to a destination device. A user-specified modification to the area is obtained. The video stream is updated by applying an updated transformation to the screen capture that obscures the updated area within the video stream.

20 Claims, 7 Drawing Sheets

SELECTIVE SCREEN SHARING

RELATED APPLICATION

Benefit is claimed under 35 U.S.C. 119(a)-(d) to Foreign Application Serial No. 201741017639 filed in India entitled "SELECTIVE SCREEN SHARING", filed on May 19, 2017 by VMware, Inc., which is herein incorporated in its entirety by reference for all purposes.

BACKGROUND

A management service can provide an enterprise with access to emails, presentations, documents, and other content to prevent theft, data loss, and unauthorized access. A user may want to discuss the emails, presentations, documents, and other content with members of the public or with other users associated with the enterprise. The content can be difficult to discuss effectively without everyone in the discussion having access to the emails, presentations, documents, and other content. While the emails, presentations, or other documents can be manually sent to the other users, some concepts in the enterprise content can be difficult to convey without a live or in-person discussion of the emails, documents, and other content.

The concept of screen sharing arose as a potential solution to this problem. However, while a user's screen can be shared, the user may have to be wary of what is shown on screen. Personal information and other sensitive information may appear, for example, in a notification bar or an authentication dialog box. This sensitive information may be inadvertently shown through screen sharing, or the screen sharing can be disrupted or disabled while users deal with sensitive information on screen. Accordingly, sharing access to the emails, presentations, documents, and other content email through screen sharing can pose significant security and privacy concerns. These problems can frustrate users.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to selective screen sharing. A management service can provide an enterprise with access to emails, presentations, documents, and other content to prevent theft, data loss, and unauthorized access. The user may want to discuss the emails, presentations, documents, and other content with members of the public or with users associated with the enterprise. A user may want to use screen sharing to discuss the content while protecting sensitive information from being inadvertently shared on screen.

Examples described include mechanisms capable of selective screen sharing. According to some examples, program instructions executable in a computing device can determine an area of a screen capture to obscure within a video stream using screen-sharing data. The video stream can be generated by application of a transformation to the screen capture. The transformation can obscure the area within the video stream. The video stream can be transmitted to a destination device. A user-specified modification to the area of the screen capture can be obtained. The video stream can be updated by application of an updated transformation to the screen capture. The updated transformation can obscure an updated area within the video stream based at least in part on the user-specified modification.

According to some examples, a user-specified annotation can be obtained and the video stream can be updated to include the user-specified annotation. In some cases, the area includes an entirety of the screen capture and the user-specified modification defines a user-specified area to permit within the video stream. In further examples the user-specified modification defines a user-specified area to obscure within the video stream, and the updated area includes the area and the user-specified area. In some examples, the transformation can include application of an opaque layer over the area. In further examples, the transformation can also include application of a Gaussian blur to the area. Further, the area can be indicated on a display device of the computing device by application of a translucent layer over the area.

Figure 1:
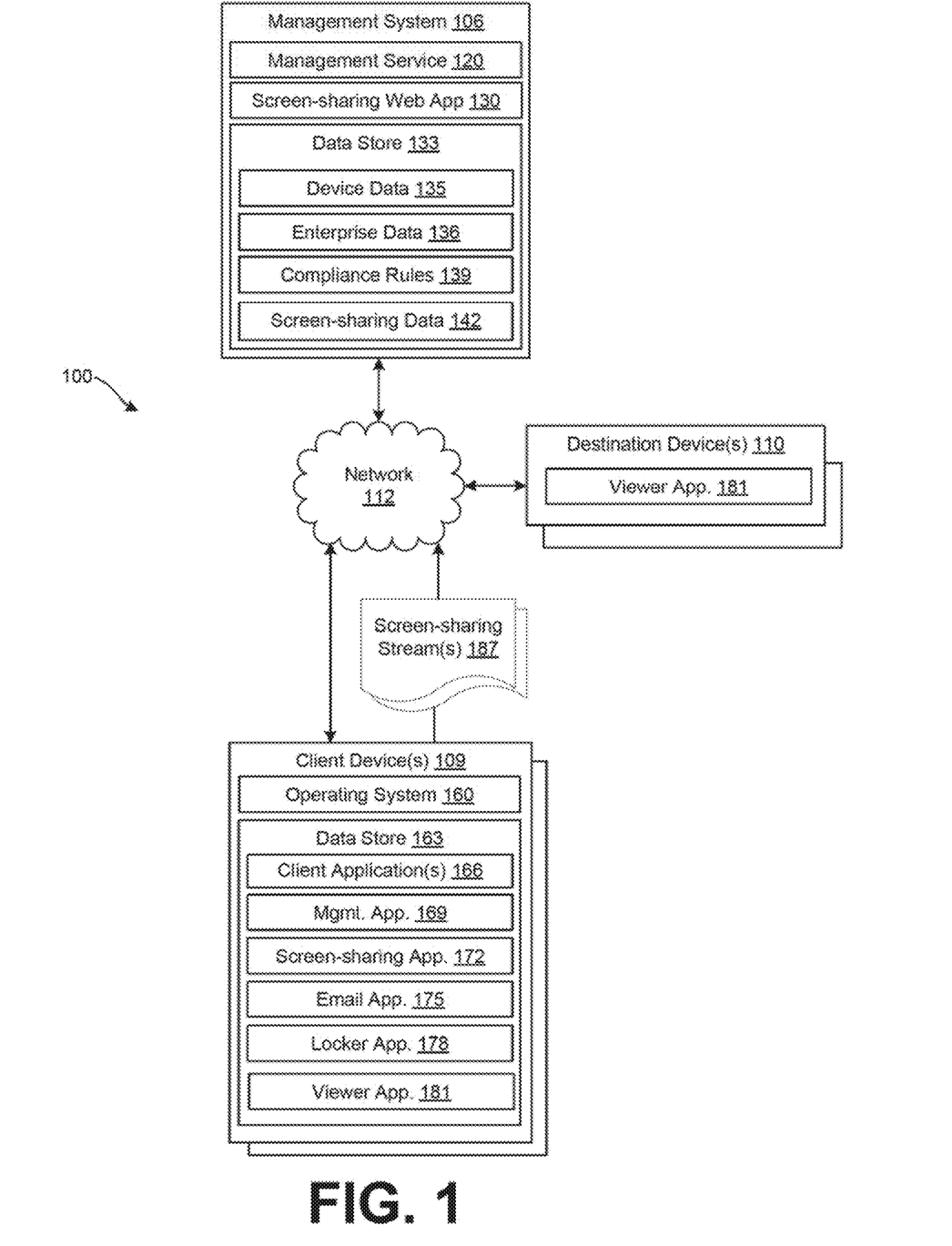
FIG. 1 is a drawing of an example of a networked environment, including a management system, a destination device, and a client device.

With reference to FIG. 1, shown is an example of a networked environment 100. The networked environment 100 can include a management system 106, client device(s) 109, and destination device(s) 110 in communication with one another over a network 112. The management system 106 can provide an enterprise with access to email, corporate documents, social media, and other enterprise content, as well as manage.

The network 112 can include, for example, the Internet, intranets, extranets, wide area networks (WANs), local area networks (LANs), wired networks, wireless networks, other suitable networks, or any combination of two or more such networks. For example, the networks can include satellite networks, cable networks, Ethernet networks, cellular networks, telephony networks, and other types of networks.

The management system 106 can include a server computer or any other system providing computing capability. Alternatively, the management system 106 can include a plurality of computing devices that are arranged, for example, in one or more server banks, computer banks, or other arrangements. The management system 106 can include a grid computing resource or any other distributed computing arrangement. The computing devices can be located in a single installation or can be distributed among many different geographical locations. The management system 106 can also include or be operated as one or more virtualized computer instances. For purposes of convenience, the management system 106 is referred to in the singular. Even though the management system 106 is referred to in the singular, it is understood that a plurality of management systems 106 can be employed in the various arrangements as described above. As the management system 106 communicates with the client device 109 remotely over the network 112, the management system 106 can be described as a remote management system 106 or a collection of one or more remote computing devices.

The management system 106 can execute a management service 120 to oversee management of the client devices 109. The components executed on the management system 106 can include, for example, the management service 120, as well as other applications, services, processes, systems, engines, or functionality not discussed in detail. In some embodiments, an enterprise, such as one or more companies or other organizations, can operate the management service 120 to oversee or manage the operation of the client devices 109 of its employees, contractors, customers, students, or other users having user accounts with the enterprise. An enterprise can be any customer of the management service 120, and such an enterprise can also be referred to as an organization. The enterprise or organization can have a hierarchy. A hierarchy can be an organizational structure that links the individuals and/or groups in the enterprise. For example, an individual or group can be responsible for management of one or more subordinate individuals or groups, who can in turn be responsible for management of one or more subordinate individuals or groups, and so on.

The management service 120 can have a command queue storing at least one action to perform on a particular client device 109 upon check-in of the client device 109. For instance, the management application 169 can cause the client device 109 to check-in with the management service 120, identify an action in the command queue, and perform the action. An action in the command queue can direct the installation of a profile, or the execution of a command or other actions to install software components or implement policies.

Also, the management service 120 can request that the client device 109 check in using a notification service like APPLE® Push Notification Service (APNS), GOOGLE® Cloud Messaging (GCM), or WINDOWS® Push Notification Services (WNS). For example, the management service 120 can transmit a request to the notification service requesting that the client device 109 check-in. The notification service can push or otherwise route a notification to the client device 109. Once the notification is received, the management application 169 can cause the client device 109 to check-in with the management service 120. As described above, the management application 169 can determine whether a command queue provided by the management service 120 for the respective client device 109 contains any commands or resources for the client device 109, and, if so, can cause the commands or resources to be downloaded and/or implemented on the client device 109.

The management service 120 can provide functionality using application program interfaces (APIs). The management service 120 can oversee the operation of client devices 109 enrolled with the management service 120 as well as manage enrollment and un-enrollment operations of the client devices 109. APIs or API calls can be provided for other functionalities of the management service 120 as discussed. For instance APIs provided can include Representational State Transfer (REST) APIs, Identity Services Engine (ISE) APIs, and other APIs.

The data store 133 can include memory of the management system 106, mass storage resources of the management system 106, or any other storage resources on which data can be stored and accessed by the management system 106. The data stored in the data store 133 can include, for example, management data including device data 135, enterprise data 136, compliance rules 139, and screen-sharing data 142, as well as other data.

Generally, device data 135 can include data associated with a configuration of a client device 109 enrolled or managed by the management service 120 as well as an identifier of the client device 109. The identifier can be a serial number, media access control (MAC) address, other network address, or other device identifier. In addition, the device data 135 can include an enrollment status indicating whether a client device 109 has been enrolled with the management service 120. In one example, a client device 109 designated as "enrolled" can be permitted to access the enterprise data 136 while a client device 109 designated as "not enrolled," or having no designation, can be denied access to the enterprise data 136.

Additionally, device data 135 can include indications of the state of the client device 109. In one example, these indications can specify applications that are installed on the client device 109, configurations or settings that are applied to the client device 109, user accounts associated with the client device 109, the physical location of the client device 109, the network to which the client device 109 is connected, and other information describing the current state of the client device 109.

Further, device data 135 can also include data pertaining to user groups. An administrator can specify one or more of the client devices 109 as belonging to a user group. User groups can be created by an administrator of the management service 120 such that a batch of client devices 109 can be configured according to common settings. For instance, an enterprise can create a user group for the marketing department and the sales department, where the client devices 109 in the marketing department are configured differently from the client devices 109 in the sales department. Enterprise data 136 can include email, corporate documents, social media, messages, enterprise applications, and other enterprise content or communications. The management service 120 can be employed to manage and control access to the enterprise data 136 associated with an enterprise. The management service 120 can provide systems and applications to allow such access based on user accounts, user groups, device data 135, compliance rules 139, screen-sharing data 142, and other information.

Compliance rules 139 can include, for example, configurable criteria that must be satisfied for an enrolled one of the client devices 109 to be "in compliance" with the management service 120. The compliance rules 139 can be based on a number of factors including geographical location of the client device 109, activation status, enrollment status, authentication data including authentication data obtained by a device registration system, time, and date, and network properties, among other factors. The compliance rules 139 can also be determined based on a user profile associated with a user. The user profile can be identified by obtaining authentication data associated with the client device 109. The user profile can be associated with compliance rules 139 that are further determined based on time, date, geographical location and network properties detected by the client device 109. The user profile can further be associated with a user group, and compliance rules 139 can be determined in view of the user group.

Compliance rules 139 can include predefined constraints that must be met in order for the management service 120, or other applications, to permit access to the enterprise data 136 or other features of the client device 109. In some examples, the management service 120 communicates with a management application or another client application 166 executable on the client device 109 to determine whether states exist on the client device 109 that do not satisfy one or more compliance rules 139. Some of these states can include, for example, a virus or malware being detected on the client device 109, installation or execution of a blacklisted client application 166, or a client device 109 being "rooted" or "jailbroken," where root access is provided to a user of the client device 109. Additional states can include the presence of particular files, questionable device configurations, vulnerable versions of client applications 166, or other vulnerability, as can be appreciated. In other examples, the compliance rules 139 can be configured in the management service 120 as specified by an administrator.

Screen-sharing data 142 can include rules or predefined constraints that must be met in while the screen-sharing web application 130 or the screen-sharing application 172 transmits a screen-sharing stream 187. The screen-sharing stream 187 can be a video steam of a screen capture of a screen generated for display on the client device 109. In some examples, the management service 120 communicates with a management application 169, screen-sharing application 172, or another client application 166 executable on the client device 109 to determine which states exist on the client device 109, for example, which client applications 166 are installed, running, and/or displayed on the client device 109. Additional states can include the presence of particular files, enterprise applications and other client applications 166, versions of client applications 166, windows, dialog boxes, operating system elements, or other sensitive information that may be displayed on the client device 109, as can be appreciated. Screen-sharing data 142 can be stored on the data store 133 and provided to the client device 109 from the management service 120 or the screen-sharing web application 130, or can be stored on the data store 163 of the client device 109.

The screen-sharing data 142 can include information about locations of sensitive information in panes, dialog boxes, user interface elements, and areas of the operating system 160, client applications 166 including the email application 175 and the locker application 178, network sites, and the like. For example, when a particular client application 166 is opened, the screen-sharing data 142 can indicate that all or a portion of the client application 166 be hidden, blocked, blurred, or otherwise obscured in a screen-sharing stream 187. The screen-sharing data 142 can indicate that all or a particular portion of an operating system 160 should be hidden, blocked, blurred, or otherwise obscured in a screen-sharing stream 187. In some cases, the screen-sharing data 142 can include enterprise rules designed or set up by an administrator. The screen-sharing data 142 can also include customized rules that are designed or set up by a user of the client device 109. In some cases, the enterprise rules cannot be overridden by customized rules. Screen-sharing data 142 can also include multiple sharing levels depending on the intended audience or destination device 110 for a screen-sharing stream 187. For example, a certain area of a network site, a locker application 178 or another client application 166 can include a particular file, a contact list, or other enterprise data 136 that should be hidden from public view, or perhaps employees of a particular user group, while being appropriate for other users of another user group associated with the enterprise. Other areas can include authentication dialog boxes, or log in screens, which may contain personal or secret information that should be bidden from all users and should be applied universally. Accordingly, the screen-sharing data 142 can include universal rules, public display rules, rules for certain user groups, enterprise rules, and other rules.

In some embodiments, an enterprise can operate the management service 120 to oversee or manage the operation of the client devices 109 of its employees, contractors, customers, students, or other users having user accounts with the enterprise. The management service 120 can remotely configure the client device 109 by interacting with a management application 169 or another client application 166 executed on the client device 109.

The management service 120 can transmit various software components to the client device 109 which can then be installed or configured by the management application 169. Such software components can include, for example, additional client applications 166, resources, libraries, drivers, device configurations, or other similar components that require installation on the client device 109 as specified by an administrator of the management service 120. The management service 120 can further cause policies to be implemented on a client device 109. Policies can include, for example, restrictions or permissions pertaining to capabilities of a client device 109. For instance, policies can require certain hardware or software functions of the client device 109 to be enabled or disabled during a certain time period or when the client device 109 is physically located at a particular location. Such policies can be implemented by the management application 169.

The management service 120 can also provide access to screen sharing services through a network site, a screen-sharing web application 130, or client applications 166 on the client device 109 such as a browser application or the screen-sharing application 172. In some cases, the screen-sharing web application 130 can be considered part of the management service 120. A user interface of the network site or screen-sharing web application 130 can provide personalized selective screen sharing for applications, documents, emails, network sites, windows, operating system and other user interface elements displayed on screen using the screen-sharing data 142. For example, a user can navigate to the screen-sharing web application 130 and enable screen sharing. The screen-sharing web application 130 can identify the applications and other user interface elements being displayed. The screen-sharing web application 130 can identify destination devices 110 for screen-sharing streams 187, such as a television, monitor for a local presentation, or a client device over a network. The screen-sharing web application 130 can determine initial areas of a screen capture to obscure in screen-sharing streams 187 based on the screen-sharing data 142. The screen-sharing web application 130 can then transmit screen-sharing streams 187 to the desired destination devices 110 with the screen-sharing data 142 applied. Updated or user-specified areas to permit and/or obscure in screen-sharing streams 187 can also be applied that modify the screen-sharing streams 187 that are being transmitted.

A viewer web application or network site can also be provided by the management service 120 to provide access to a screen-sharing stream 187 from the screen-sharing application 172 or the screen-sharing web application 130. In some cases, the viewer web application can be a part of the screen-sharing web application 130.

The client device 109 can be representative of one or more client devices 109. The client device 109 can include a processor-based system, such as a computer system, that can include a desktop computer, a laptop computer, a personal digital assistant, a cellular telephone, a smartphone, a set-top step, a music player, a tablet computer system, a game console, an electronic book reader, a smartwatch, or any other device with like capability. The client device 109 can have an operating system 160 that can perform functionalities and execute applications. The operating system 160 can be stored in a data store 163 that also includes client applications 166, a management application 169, a browser application, a screen-sharing application 172, an email application 175, a locker application 178, a viewer application 181, screen-sharing data 142, and other data. Client applications 166 can include any of the applications discussed, as well as device management applications, enterprise applications, word processors, spreadsheet applications, media player applications, or other applications.

The client device 109 can also be equipped with networking capability or networking interfaces, including a localized networking or communication capability, such as a near-field communication (NFC) capability, radio-frequency identification (RFID) read or write capability, or other localized communication capability. In some embodiments, the client device 109 is mobile where the client device 109 is easily portable from one location to another.

The operating system 160 can be configured to execute various client applications 166, such as the management application 169, the screen-sharing application 172, the email application 175, the locker application 178, the viewer application 181, or another application. The operating system 160 and some client applications 166 can access network content including web applications that can provide services much like the various applications discussed. Such network content and web applications can be served up by the management system 106 or other servers, thereby rendering a user interface on a display of the client device 109, such as a liquid crystal display (LCD), organic light emitting diode (OLED) display, touch-screen display, or other type of display device.

The management application 169 can be executed in the client device 109 to perform actions on the client device 109. For example, the management application 169 can cause the client device 109 to check-in with the management service 120, identify an action in the command queue, and perform the action. An action can be the installation of a profile, or the execution of a command or other actions to install software components or implement policies. In some cases, the management application 169 can cause a check-in of the client device 109 periodically, on a schedule, or upon an event such as entering a physical location, changing a state of the client device 109, installing an application, or receiving a notification on the client device 109. In one example, the contents of the command queue can include a command that the management application 169 causes to be executed on the client device 109. In another example, the contents of the command queue can include a resource or a client application 166 that the management application 169 causes to be installed on the client device 109, which the client device 109 may access through a specified uniform resource locator (URL).

A browser application can be executed in the client device 109 render a user interface for a network page, an application screen, or other interface. The client device 109 can also access web applications including the screen-sharing web application 130 through the network 112 using the browser application, which can render a user interface associated with a web application or network site on the client device 109.

The screen-sharing application 172 can provide personalized selective screen sharing for applications, documents, emails, network sites, windows, operating system and other user interface elements of a screen generated for display on the client device 109. A screen-sharing stream 187 can be personalized using the screen-sharing data 142. For example, a user can open the screen-sharing application 172 and enable screen sharing. The screen-sharing application 172 can identify the applications and other user interface elements on a screen generated for display on the client device 109. The screen-sharing application 172 can identify destination devices 110 for screen-sharing streams 187, such as a television or monitor for a local presentation, or a client device 109 over a network. The screen-sharing application 172 can determine initial areas of a screen capture to permit and/or obscure in screen-sharing streams 187 based on the screen-sharing data 142. The screen-sharing application 172 can then transmit screen-sharing streams 187 to the desired destination devices 110 with the screen-sharing data 142 applied. Updated or user-specified areas of a screen capture to permit and/or obscure in screen-sharing streams 187 can also be applied while the screen-sharing streams 187 are being transmitted.

The email application 175 can be executed in the client device 109 to provide access to email messages. A user interface of the email application 175 can organize and display the email messages. The locker application 178 can be executed in the client device 109 to provide access to shared files and other enterprise data 136 through a user interface of the locker application 178.

The viewer application 181 can be executed in the client device 109 to provide access to a screen-sharing stream 187 from the screen-sharing application 172 or the screen-sharing web application 130. In some cases, the viewer application 181 can be a part of the screen-sharing application 172.

The destination device 110 can be representative of many destination devices 110. The destination device 110 can be similar to the client devices 109, and can be connected to the client device 109 through the network 112. The destination device 110 can also be a display peripheral of the client device 109, such as a projector, a monitor, a television, or another display device that is connected to the client device 109 directly or through the network 112. In some cases, the destination device 110 can execute the viewer application 181, and the viewer application 181 provides access to a screen-sharing stream 187 from the screen-sharing application 172 through a display of the destination device 110. In other cases, the screen-sharing stream 187 can be transmitted from the screen-sharing application 172 and displayed on the destination device 110 without the viewer application 181.

Figure 2:
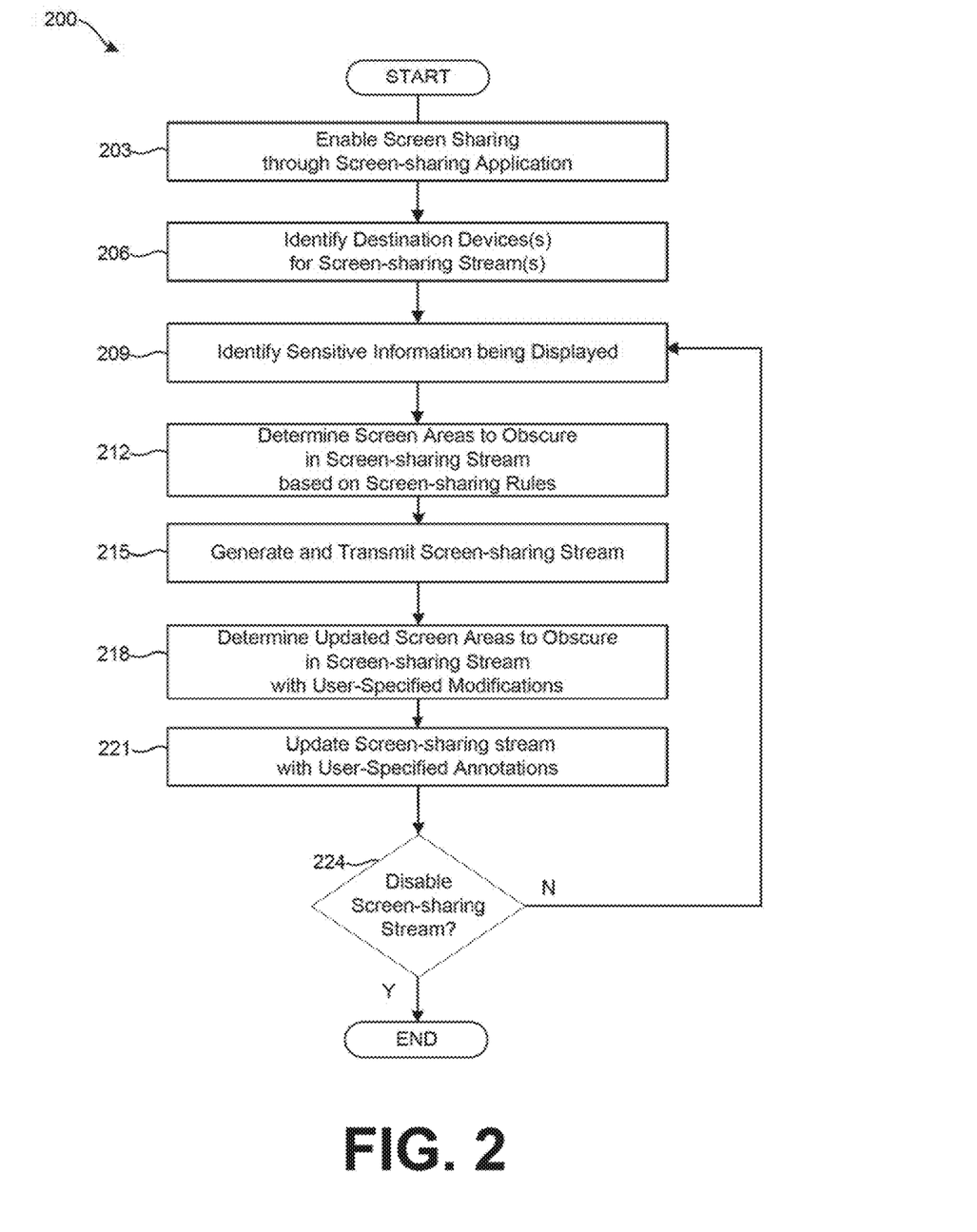
FIG. 2 is an example flowchart illustrating functionality implemented by components of the networked environment.

In FIG. 2, shown is an example flowchart 200 describing steps that can be performed by the screen-sharing application 172. Generally, the flowchart 200 describes how the screen-sharing application 172 provides selective screen sharing. The screen-sharing web application 130 can also provide this functionality.

Starting with step 203, screen sharing can be enabled through the screen-sharing application 172. For example, the screen-sharing application 172 can be installed and executed on the client device 109. In some cases, once launched or executed, the screen-sharing application 172 can run in a background of the client device 109. A user of the client device 109 can enable screen sharing by activating a user interface element of the screen-sharing application 172 on the client device 109. In some cases, once launched, the screen-sharing application 172 can generate and provide a user interface element that slides from a side of a display of the client device 109, in response to a swipe from the user from the side of the display. In other cases, the user interface element can be generated by the screen-sharing application 172 in a full screen interface, a window, or a pane, or otherwise on a display of the client device 109. In some examples, a user interface element that enables screen sharing by the screen-sharing application 172 can be provided through a menu, window, pane, desktop, or another part of the operating system 160. Alternatively, a user of a client device 109 can navigate to a network page of the screen-sharing web application 130 through a browser application or another client application 166 of the client device 109. The user interface element that enables screen sharing can be provided through a user interface element generated by the screen-sharing web application 130 and accessed through a browser application or another client application 166 of the client device 109.

In step 206, the screen-sharing application 172 can identify destination devices 110 to which the screen-sharing streams 187 are to be transmitted. The destination devices 110 can be local or remote devices connected to the client device 109, for example a peripheral display device connected to the client device 109, or another device that is connected to the client device 109 through the network 112. For example, the screen-sharing application 172 can identify a port or local address of a display device that is connected to the client device 109. In further examples, the screen-sharing application 172 can identify a network address of the destination device 110. The particular destination device 110 can be associated with a user account that is managed by the management service 120, or a session identifier. The screen-sharing application 172 can determine a network address to which the screen-sharing stream should be transmitted based on a network address associated with the user account or the session identifier. The screen-sharing application 172 can determine that a screen-sharing stream 187 is public or is to be transmitted to a user of a certain user group, and certain enterprise data should be shown or obscured in the screen-sharing stream 187. In other cases, the screen-sharing application 172 can generate a user interface element through which a user of the client device 109 can identify a level of protection to use for each screen-sharing stream 187 to be sent to each of the destination devices 110.

In step 209, the screen-sharing application 172 can identify sensitive information being displayed on a display of the client device 109. For instance, the screen-sharing application 172 can identify the operating system 160 of the client device 109 or a version of the operating system 160 by scanning or searching the data store 163 for system information that can be used to identify the operating system 160. The screen-sharing application 172 can identify that the operating system 160 includes notifications, a list of open applications, a taskbar, a login screen, a dialog box, or other sensitive information in a predetermined area of the display of the client device 109. The screen-sharing data 142 can store data that identifies that the notifications are provided by the operating system 160 in the predetermined areas of the display of the client device 109. The screen-sharing application 172 can use the screen-sharing data 142 to identify the predetermined areas of the screen generated for display on the client device 109.

The screen-sharing application 172 can also identify one or more client applications 166 that are running or are being launched in the client device 109 and whether these client applications 166 are being displayed or will be displayed on the client device 109. For example, the screen-sharing application 172 can scan or examine a task list or other data of the client device 109. The screen-sharing application 172 can identify that the client applications 166 include notifications, messages, a login screen, an authentication or other dialog box, or other sensitive information in a predetermined area of the screen generated for display on the client device 109. The screen-sharing data 142 can store data that identifies that the predetermined areas where sensitive information appears in the client applications 166 in the screen. The screen-sharing application 172 can use the screen-sharing data 142 to identify the predetermined areas of the screen.

In step 212, the screen-sharing application 172 can determine area(s) of the screen capture to obscure in screen-sharing stream(s) 187 based on screen-sharing data 142. For example, the screen-sharing application 172 can identify that a user interface of the operating system 160 is in a screen being generated for display on the client device 109, and the screen-sharing data 142 can require that a notifications area or a taskbar of the operating system 160 should be obscured in the screen-sharing stream 187. Accordingly, the screen-sharing application 172 can generate an altered version of the screen being generated for display on the client device 109, for example by applying an overlay, filter, or another transformation to the screen capture to obscure the particular areas and transmitting the altered version of the screen capture in the screen-sharing stream 187.

A client application 166 can be launched while the screen-sharing stream 187 is being transmitted. The screen-sharing application 172 can identify that the client application 166 is launched and determine that all or a portion of the screen must be obscured within the screen-sharing stream 187 based on the screen-sharing data 142 corresponding to the client application 166. When the particular client application 166 is opened on screen while screen sharing is enabled, all or a portion of the screen can be blacked-out or covered with any opaque layer, blurred, dimmed, or otherwise obscured in the screen-sharing stream 187. In some cases, a login screen, or an authentication dialog box of the operating system 160 or client application 166 can be generated in the screen for display on the client device 109. The screen-sharing application 172 can obscure the portion of the screen that includes the login screen or the authentication dialog box. Further, the particular destination device 110 can be associated with a user account that is managed by the management service 120, and the screen-sharing data 142 can be used by the screen-sharing application 172 to determine which areas of the screen generated for display on the client device 109 should be shown and/or obscured in the screen-sharing stream 187. In some cases, the areas with sensitive information are not known for a particular client application 166, or the information about the screen generated for display on the client device 109 is otherwise unknown. The screen-sharing data 142 can indicate that all or a particular area of the screen should be obscured in the screen-sharing stream 187 when the application 166 initially is shown on the screen generated for display on the client device 109.

In step 215, the screen-sharing application 172 can generate and transmit the screen-sharing streams 187. The screen-sharing application 172 can generate the screen-sharing stream 187 by applying a filter, an overlay, or another transformation or to a video screen capture of the client device 109. The screen-sharing application 172 can transmit the filtered, overlaid, or otherwise transformed version of the screen capture through the screen-sharing stream 187. Generating the screen-sharing stream 187 can include blacking-out, whiting-out, coloring, dithering, dimming, washing-out, pixelating, or otherwise obscuring all or a particular area of the screen based on the screen-sharing data 142. In cases where there are multiple screen-sharing streams 187, each can have a different area obscured based on the screen-sharing data 142 and the destination device 110 or a user account or level of protection associated with the destination device 110. Where no user account is identified, a user of the client device 109 can indicate a level of protection to associate with each destination device 110. In some examples, a video steam of a screen capture of a client device 109 can be transmitted from the client device 109 to the management service 120. The management service 120 can generate the screen-sharing stream 187 by applying a filter, an overlay, or another transformation to the video stream of the screen capture of the client device 109.

In step 218, the screen-sharing application 172 can determine updated screen area(s) to obscure in the screen-sharing stream 187 based on a user-specified modification. For example, the screen-sharing data 142 can specify that the entirety of the screen capture of the client device 109 must be obscured in the screen-sharing stream 187. The screen-sharing application 172 can obtain user-specified modification that permits a portion of the screen capture to be shown in the screen-sharing stream 187. An updated transformation can be applied that obscures the rest of the screen capture other than the portion of the screen capture permitted to be shown in the screen-sharing stream 187 according to the user-specified modification.

In another example, the screen-sharing data 142 can specify that initially, a predefined area of the screen capture of the client device 109 must be obscured in the screen-sharing stream 187. The screen-sharing application 172 can obtain user-specified modification to permits all or some of the predefined area to be shown in the screen-sharing stream 187. Additionally or alternatively, the user-specified modification can identify an additional area to obscure in the screen-sharing stream 187. The screen-sharing application 172 can determine an updated area to obscure in the screen-sharing stream 187 based on the user-specified modification and an updated transformation can be applied that obscures in the screen-sharing stream 187 according to the user-specified modification. In some cases, the screen-sharing data can also define certain areas that the user-specified modification cannot permit, and when the user-specified modification is obtained, the updated transformation can obscure these areas despite the user-specified modification.

The screen-sharing application 172 can generate and provide user interface elements or modification tools that obtains the user-specified modification. The modification tools can include a rectangular selection tool that a user can manipulate to select a rectangular area. For example, the user can indicate a first location on a screen of the client device 109 and can further indicate a second location on the screen. The screen-sharing application 172 can define a rectangular area using the first location and the second location, and the first location can be a first corner of the rectangular area while the second location can be an opposite corner of the rectangular area. In some cases, the user can click (or touch) at the first location, drag to the second location, and release. The rectangular area can define either an area to permit or obscure in the screen-sharing stream 187. The modification tools can also include an oval selection tool that a user can similarly manipulate to select an oval-shaped area. Modification tools to select triangles, hexagons, stars, or other shapes can also be provided.

The modification tools provided by the screen-sharing application 172 can include a freeform selection tool that a user can manipulate to select a freeform area. For example, the user can click, touch, or otherwise indicate a first location on a screen of the client device 109, and can further draw a freeform shape and release at a second location on the screen. The screen-sharing application 172 can define a freeform area using the first location and the second location. In some cases, the second location can be the same as the first location, and the freeform area can be the area defined within the freeform shape drawn by the user. In some cases, the second location is not the same as the first location, and the screen-sharing application 172 can draw a line (straight, curved or other line from the second location to the first location, thereby defining a freeform area using the freeform shape drawn by the user. The freeform area can define either an area to permit or obscure in the screen-sharing stream 187. The modification tools provided can further allow rectangular, oval-shaped, and other shapes to be stretched horizontally and/or vertically, rotated, moved, and further manipulated.

The screen-sharing application 172 can also obtain the user-specified modification through a user interface element that when selected, permits or obscures a predefined area. For example, the user interface element can be selected to permit or obscure a notifications area, a toolbar, taskbar, a clock, a tray, a contact list, an authentication dialog box, or any predefined area as defined in data for certain applications, network sites, operating systems, and the like. The predefined area can also permit or obscure an entirety of the screen capture within the screen-sharing stream 187.

In step 221, the screen-sharing application 172 can update the screen-sharing stream 187 with user-specified annotations. The screen-sharing application 172 can generate and provide user interface elements or annotation tools that obtains the user-specified annotations. The annotation tools provided by the can include a drawing tool that a user can manipulate to draw a freeform line. For example, the user can click, touch, or otherwise indicate a first location on a screen of the client device 109, and can further draw a freeform line or shape and release at a second location on the screen. The a straight line drawing tool can also be used to form a straight line by clicking, touching, or otherwise indicating a first location on a screen of the client device 109, and releasing at a second location on the screen. A straight line between the points can be drawn. The annotation tools can further allow a user to define line attributes like a thickness, a color of the freeform line or shape, and leaders and other ends can be included at each end of straight and freeform lines.

The annotation tools can include a rectangular drawing tool that a user can manipulate to draw a rectangular shape. For example, the user can indicate a first location on a screen of the client device 109, and can further indicate a second location on the screen. The screen-sharing application 172 can define a rectangular shape using the first location and the second location, and the first location can be a first corner of the rectangular shape while the second location can be an opposite corner of the rectangular shape. In some cases, the user can click (or touch) at the first location, drag to the second location, and release. The annotation tools can also include an oval drawing tool that a user can similarly manipulate to draw an oval-shaped area. Annotation tools to select triangles, hexagons, stars, or other shapes can also be provided. The annotation tools can further allow a user to define line attributes like a thickness, a color of the drawn line or shape.

The annotation tools can include a text tool that a user can manipulate to enter text on the screen. Color, font, and other text attributes can be selected. In some cases, text can be added to the shapes and lines. The annotation tools provided can further allow lines, shapes, text, and other annotations to be stretched horizontally and/or vertically, rotated, moved, and further manipulated. For the modification tools and annotation tools discussed, the particular user control details are illustrative, and other control styles and methods can be utilized.

User-specified modifications, annotations, settings, and other customizations can be stored for later use, for example, as customized screen-sharing data 142. This can save time and provide convenience for the user whenever the screen-sharing application 172 is used, so that certain user-specified modifications need not be manually applied in every instance. The customized screen-sharing data 142 can include user-specified modifications, annotations, settings, and other customizations for specific applications, operating systems, network sites, and elements of each, as well as global settings. For example, the customized screen-sharing data 142 can specify that the transformation used for authentication boxes should be a black opaque layer over the authentication boxes, while a Gaussian blur is used for notifications areas. The customized screen-sharing data 142 can specify that the entire screen be obscured (or permitted) when the locker application 178 is initially displayed on the client device 109. The customized screen-sharing data 142 can specify that a contacts list area be obscured or permitted for a particular client application 166. The user-specified modifications, annotations, and settings can be stored in the data store 163 of the client device 109, or in the data store 133 of the management system 106 in association with a user account and/or the client device 109.

In step 224, the screen-sharing application 172 can determine whether the user has disabled the screen-sharing stream 187. If the user has not disabled screen-sharing stream 187, the screen-sharing application 172 can proceed back to step 209 and again identify any new sensitive information being displayed, determine screen areas to obscure based on screen-sharing data 142, and so on. If the user has disabled screen-sharing stream 187, the screen-sharing application 172 can end.

Figure 3A:
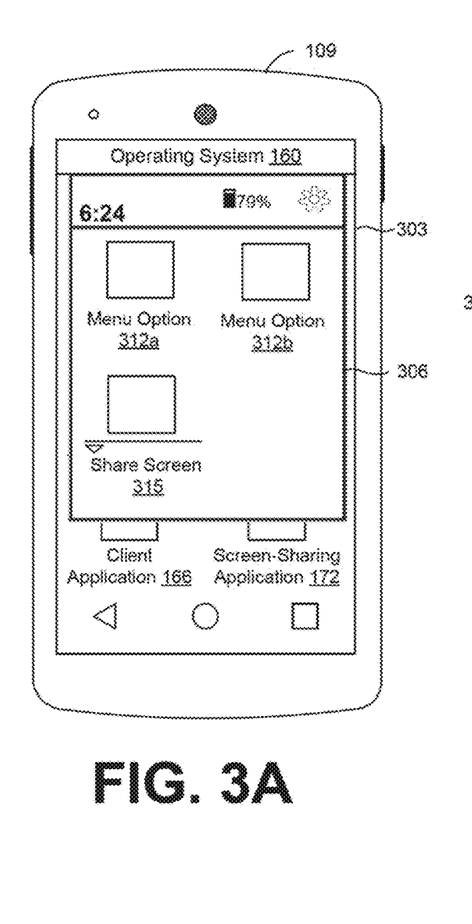
FIGS. 3A-B are drawings illustrating functionalities implemented by components of the networked environment and rendered on the client device.

With reference to FIG. 3A, shown is an example illustration of a client device 109 executing an operating system 160 to render a user interface 303. The user interface 303 includes an icon for a client application 166 and an icon for a screen-sharing application 172, as well as a menu 306. The menu 306 can be accessed by swiping down from a top of the touch display of the client device 109, or in another manner. The menu 306 can include menu options 312*a* and 312*b* as well as share screen option 315. The menu 306 can be a menu provided by the operating system 160. The share screen option 315 can be an icon or another user interface element that when selected enables screen sharing though the screen-sharing application 172. In some cases, the screen-sharing application 172 can already be running in the background, and in other cases, selecting the share screen option 315 can cause the screen-sharing application 172 to be launched and executed in the client device 109. In some cases, the icon of the share screen option 315 can be activated to toggle (e.g., enable and disable) screen sharing though the screen-sharing application 172. Further, in some examples selecting the text or the arrow shape under the icon of the share screen option 315 can cause further screen share options and/or tools to be displayed.

Figure 3B:
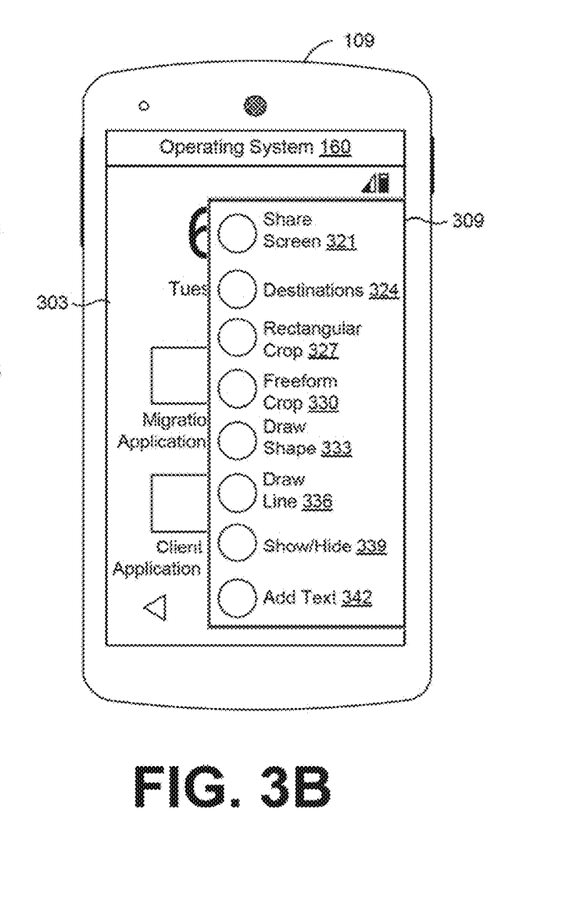

With reference to FIG. 3B, shown is an example illustration of a client device 109 executing an operating system 160 to render a user interface 303 and executing the screen-sharing application 172 to render a menu 309 of the screen-sharing application 172. The menu 309 can be accessed by swiping left from a right side of the touch display of the client device 109, or in another manner. The menu 309 can be on any side of the display of the client device 109 and can be accessed by swiping or other actions or gestures, or can be always-on-top, for example, when screen sharing is enabled, or when the screen-sharing application 172 is being executed.

The menu 309 can have user interface elements including share screen element 321, destinations element 324, rectangular crop element 327, freeform crop element 330, draw shape element 333, draw line element 336, show/hide element 339, and add text element 342, among other elements. The share screen element 321 can be activated to toggle (e.g., enable and disable) screen sharing though the screen-sharing application 172. The destinations element 324 can be activated to open a user interface of the screen-sharing application 172 to enter, choose, or otherwise identify destination device(s) 110 for transmission of the screen-sharing stream(s) 187. The rectangular crop element 327 can be activated to access a rectangular selection tool or another modification tool. The freeform crop element 330 can be activated to access a freeform selection tool or another modification tool. The draw shape element 333 can be activated to access a shape drawing tool or another annotation tool. The draw line element 336 can be activated to access a line drawing tool or another annotation tool. The show/hide element 339 can be activated to toggle a modification that obscures the entirety of the screen though the screen-sharing application 172. Other elements to toggle modifications that obscure any predefined area can also be included as discussed. The add text element 342 can be activated to access a text tool to enter text on the screen.

Figure 4A:
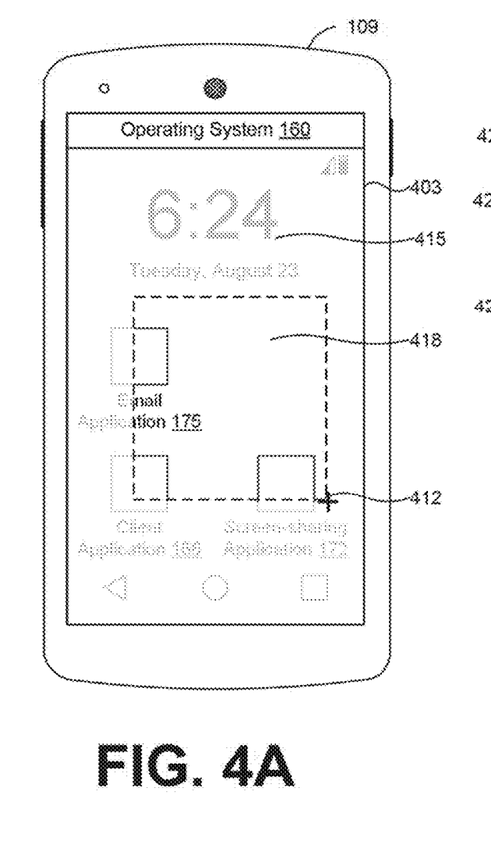
FIGS. 4A-B are drawings illustrating functionalities implemented by components of the networked environment and rendered on the client device and the destination device.

In FIG. 4A, shown is an example illustration of a client device 109 executing an operating system 160 and the screen-sharing application 172 to generate a screen 403 for display on a display device of the client device 109. The screen-sharing application 172 can generate and provide a selection tool 412. A user can manipulate the selection tool 412 to select a rectangular area as discussed above. Additional selection tools that can be manipulated to select triangles, hexagons, stars, or other shapes can also be provided. The screen-sharing application 172 can also provide a visual indication of the area that is being obscured in the screen-sharing stream 187. For example, the screen-sharing application 172 provide the visual indication on the display device by applying a translucent layer over the area 415 that is being obscured in the screen-sharing stream 187. An area 418 that is not being obscured in the screen-sharing stream 187 is not covered by the translucent layer. The translucent layer can also be dimmed, colored, or filled with hashing or another pattern.

Figure 4B:
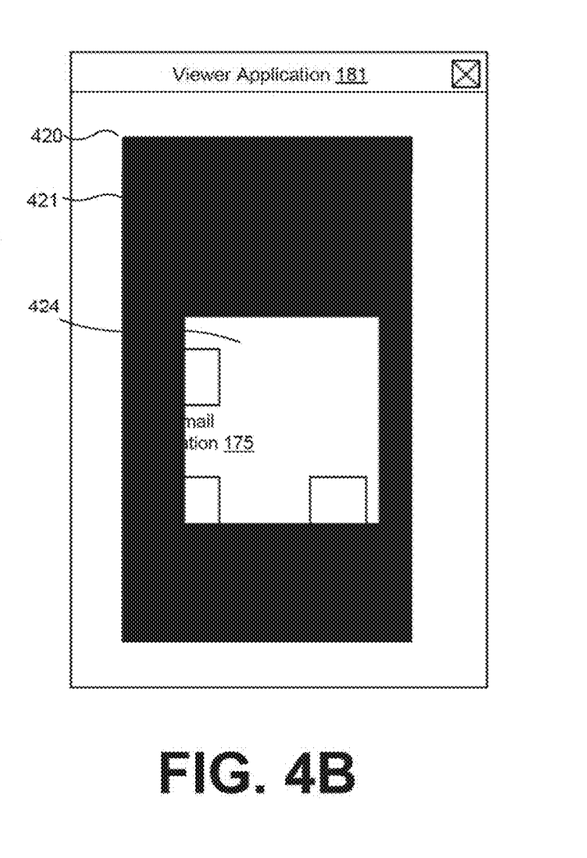

In FIG. 4B, shown is an example illustration of a viewer application 181 executed in a destination device 110 to generate a shared screen 420 of a screen-sharing stream 187 corresponding to the screen 403 of FIG. 4A. The shared screen 420 of a screen-sharing stream 187 can alternatively be displayed in a destination device 110 that does not execute the viewer application 181. The shared screen 420 can include an obscured area 421 and an area 424 that is not obscured. The obscured area 421 can be blacked-out as shown or covered with any opaque layer. Alternatively, the obscured area 421 can be dimmed, dithered, colored, or otherwise transformed.

Figures 5A, 5B:
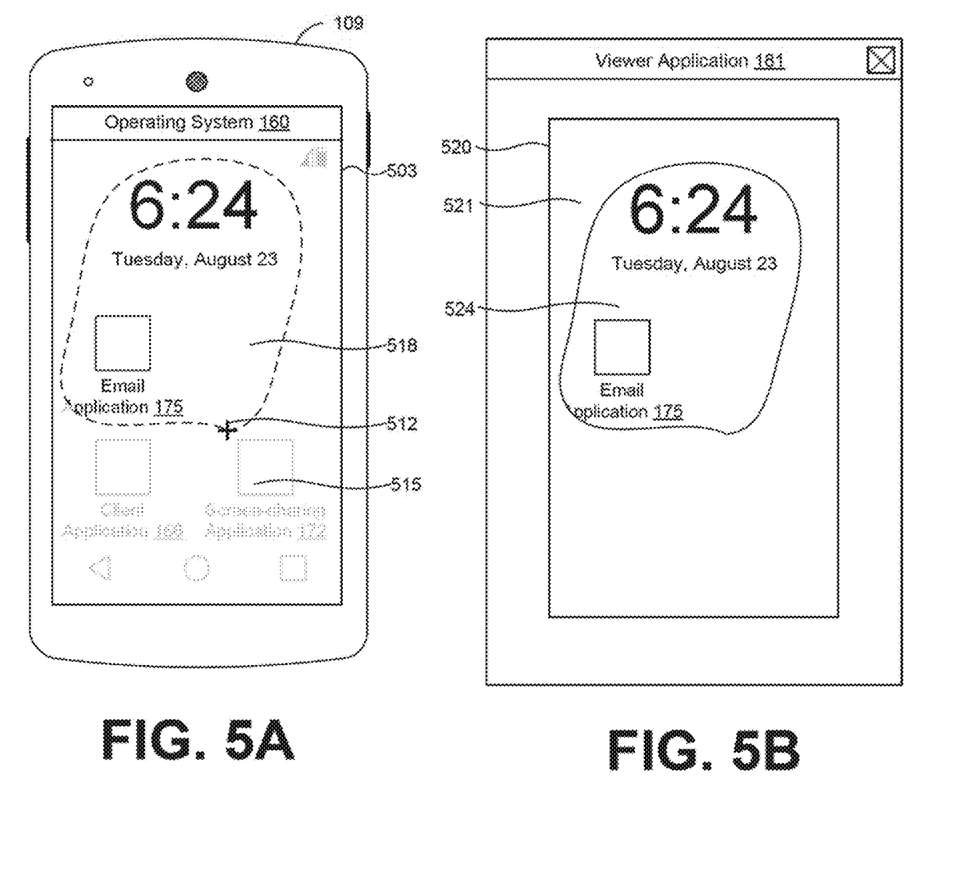
FIGS. 5A-B are drawings illustrating functionalities implemented by components of the networked environment and rendered on the client device and the destination device.

In FIG. 5A, shown is an example illustration of a client device 109 executing the operating system 160 and the screen-sharing application 172 to generate a screen 503 for display on a display device of the client device 109. The screen-sharing application 172 can generate and provide a selection tool 512. A user can manipulate the selection tool 512 to select a freeform area as discussed above. The screen-sharing application 172 can also provide a visual indication of the area that is being obscured in the screen-sharing stream 187. For example, the screen-sharing application 172 provides the visual indication on the display device of the client device 109 by applying a translucent layer over the area 515 that is being obscured in the screen-sharing stream 187. An area 518 that is not being obscured in the screen-sharing stream 187 is not covered by the translucent layer. The translucent layer can also be dimmed, colored, or filled with hashing or another pattern.

In FIG. 5B, shown is an example illustration of a viewer application 181 executed in a destination device 110 to generate a shared screen 520 of a screen-sharing stream 187 corresponding to the screen 503 of FIG. 5A. The shared screen 520 of a screen-sharing stream 187 can alternatively be displayed in a destination device 110 that does not execute the viewer application 181. The shared screen 520 can include an obscured area 521 and an area 524 that is not obscured. The obscured area 521 can be whited-out as shown or covered with any opaque layer. Alternatively, the obscured area 521 can be dimmed, dithered, colored, or otherwise transformed.

Figure 6A:
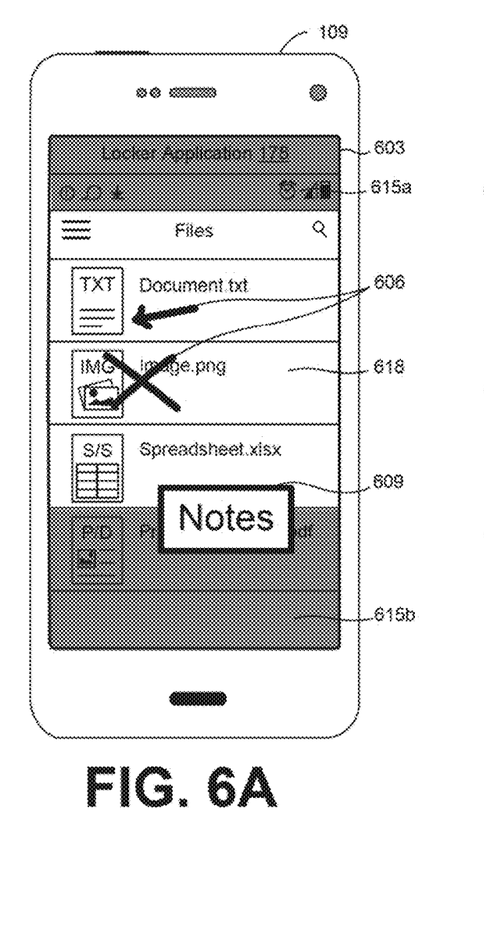
FIGS. 6A-B are drawings illustrating functionalities implemented by components of the networked environment and rendered on the client device and the destination device.

In FIG. 6A, shown is an example illustration of a client device 109 executing the operating system 160, the locker application 178, and the screen-sharing application 172 to generate a screen 603 for display on a display device of the client device 109. The screen 603 shows drawn annotations 606, and text box 609. The screen-sharing application 172 can generate and provide annotation tools that a user can manipulate to create the drawn annotations 606 and the text box 609 as discussed.

The screen-sharing application 172 can also provide a visual indication of the area that is being obscured in the screen-sharing stream 187. For example, the screen-sharing application 172 provide the visual indication on the display device of the client device 109 by applying a dimmed translucent layer over the areas 615a and 615b that are being obscured in the screen-sharing stream 187. An area 618 that is not being obscured in the screen-sharing stream 187 is not covered by the dimmed translucent layer. The area 615a can correspond to a notifications area of the operating system 160 that is identified or otherwise stored in the screen-sharing data 142. In some cases, the area 615a can be required by the screen-sharing data 142 to be obscured the screen-sharing stream 187. The area 615b can be an area added through a user-specified modification as discussed, or can be another area required by the screen-sharing data 142 to be obscured the screen-sharing stream 187. In another example, the entirety of the screen 603 can be initially required by the screen-sharing data 142 to be obscured the screen-sharing stream 187, and the area 618 can be an area permitted to be shown through a user-specified modification as discussed.

Figure 6B:
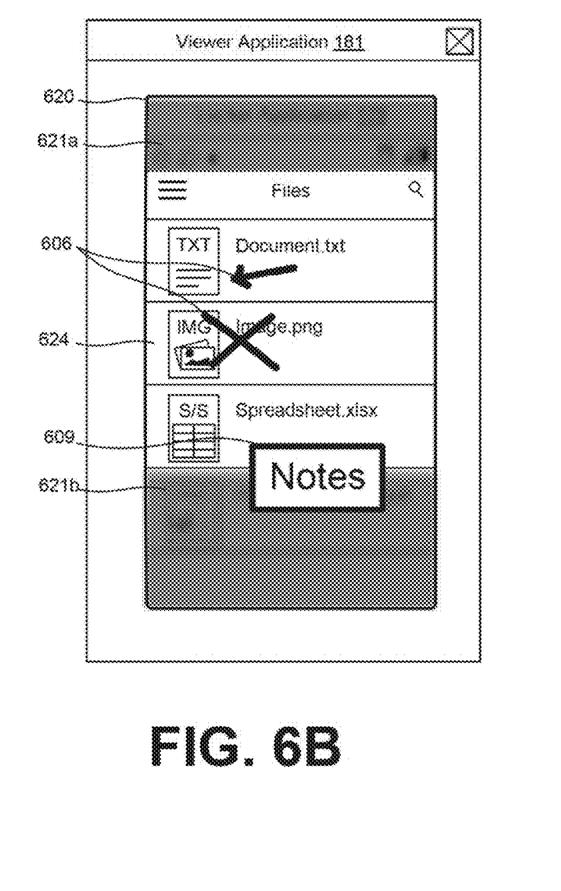

In FIG. 6B, shown is an example illustration of a viewer application 181 executed in a destination device 110 to generate a shared screen 620 of a screen-sharing stream 187 corresponding to the screen 603 of FIG. 6A. The shared screen 620 of the screen-sharing stream 187 can alternatively be displayed in a destination device 110 that does not execute the viewer application 181. The shared screen 620 can include obscured areas 621a and 621b, and an area 624 that is not obscured. The obscured areas 621a and 621b can be blurred, for example, by the client device 109 or the management service 120 applying a Gaussian blur or another transformation to these areas to generate the screen-sharing stream 187. The drawn annotations 606 and the text box 609 can also be shown in the shared screen 620 of the screen-sharing stream 187. In some cases, the drawn annotations 606 and the text box 609 can be clearly visible over the obscured areas like the obscured areas 621a and 621b.

Figure 7A:
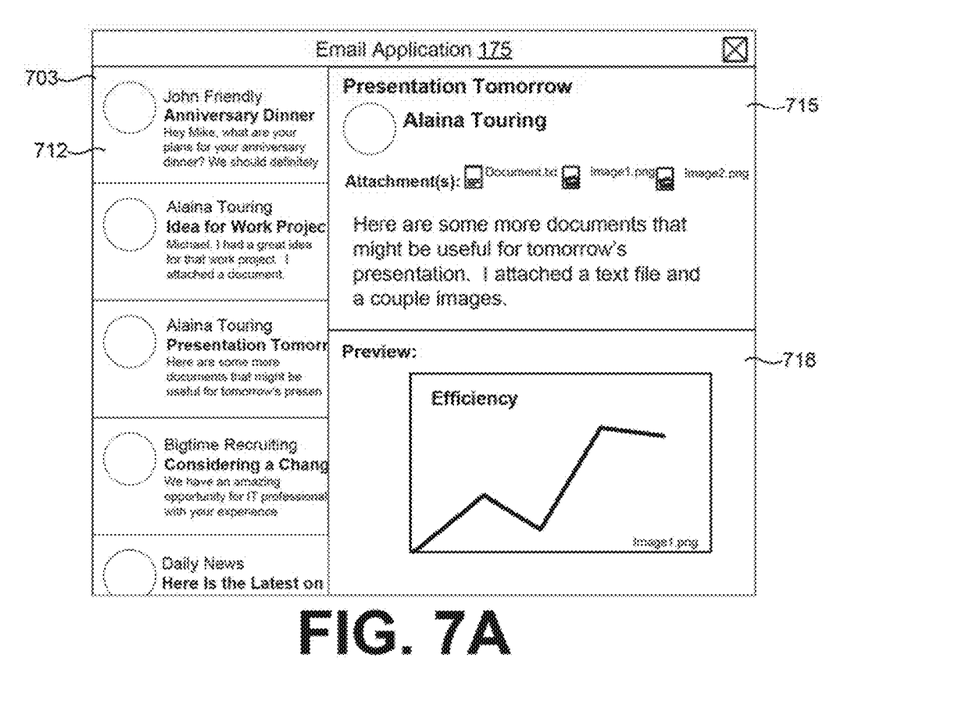
FIGS. 7A-B are drawings illustrating functionalities implemented by components of the networked environment and rendered on the client device and the destination device.

In FIG. 7A, shown is an example illustration of an email application 175 that can be shown in a screen 703 generated for display on a display device of the client device 109. The screen 703 has panes including an email list pane 712, an email pane 715 and a preview pane 718. In some cases, the respective areas of the email list pane 712, the email pane 715 and/or the preview pane 718 can be defined and stored in the screen-sharing data 142. In one example, the email list pane 712 can be considered to include sensitive information or private information, and the area of the email list pane 712 can be required to be initially obscured in the screen-sharing stream 187 when the email application 175 is displayed on the client device 109. Any of the panes can be initially obscured. As shown, in some cases, the screen-sharing application 172 does not provide a visual indication of the area that is being obscured in the screen-sharing stream 187. For example, a user can select an option to hide the visual indication, while still obscuring the area of the email list pane 712 in the screen-sharing stream 187.

Figure 7B:
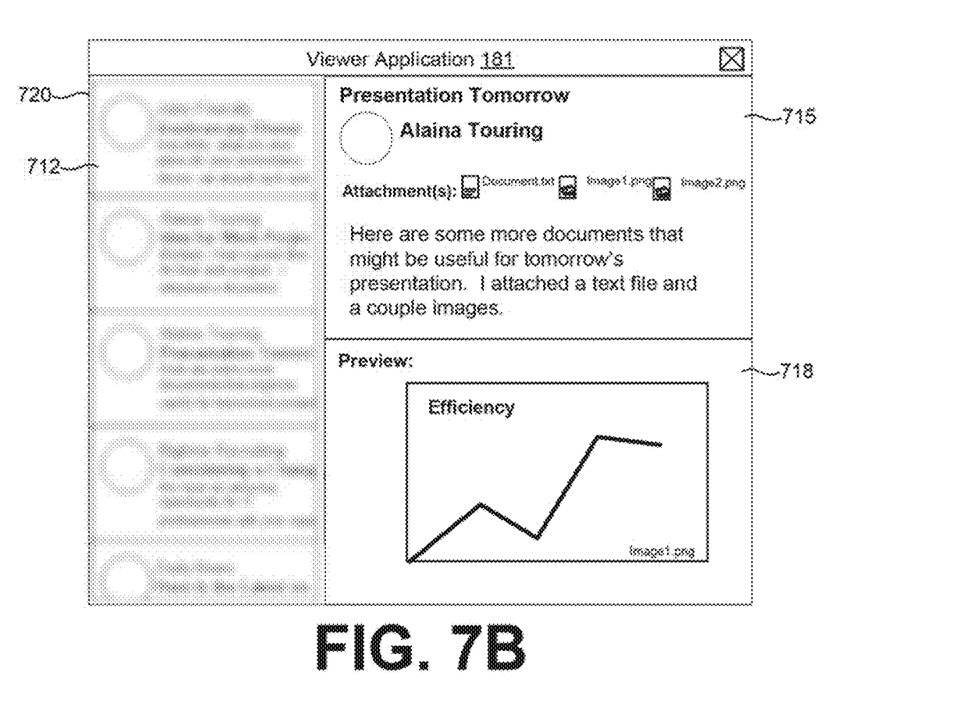

In FIG. 7B, shown is an example illustration of a viewer application 181 that can be executed in a destination device 110 to generate a shared screen 720 of a screen-sharing stream 187 corresponding to the screen 703 of FIG. 7A. The shared screen 720 of the screen-sharing stream 187 can alternatively be displayed in a destination device 110 that does not execute the viewer application 181. The shared screen 720 can include an obscured area corresponding to the email list pane 712, while the areas corresponding to the email pane 715 and the preview pane 718 are not obscured.

The client devices 109, destination device 110, and devices comprising the management system 106 can include at least one processor circuit, for example, having a processor and at least one memory device, both of which couple to a local interface, respectively. The device can include, for example, at least one computer, a mobile device, smartphone, computing device, or like device. The local interface can include, for example, a data bus with an accompanying address/control bus or other bus structure.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

The client devices 109 and the destination devices 110 can include a display upon which a user interface generated by a client application 166, viewer application 181, or another application can be rendered. In some examples, the user interface can be generated with user interface data provided by the management system 106. The client devices 109 and the d devices 110 can also include one or more input/output devices that can include, for example, a capacitive touchscreen or other type of touch input device, fingerprint reader, or keyboard.

Although the management service 120, client applications 166, and other various services and functions described can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The flowcharts show an example of the functionality and operation of an implementation of portions of components described. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the drawings can be skipped or omitted.

Also, any logic or application described that includes software or code can be embodied in any non-transitory computer-readable medium for use by or in connection with an instruction execution system such as a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described can be implemented and structured in a variety of ways. For example, one or more applications can be implemented as modules or components of a single application. Further, one or more applications described can be executed in shared or separate computing devices or a combination thereof. For example, a plurality of the applications described can execute in the same computing device, or in multiple computing devices.

It is emphasized that the above-described embodiments of the present disclosure are merely possible examples of implementations described for a clear understanding of the principles of the disclosure. Many variations and modifications can be made to the above-described embodiments without departing substantially from the spirit and principles of the disclosure. All such modifications and variations are intended to be included within the scope of this disclosure.

What is claimed is:

1. A system, comprising:
   a computing device; and
   program instructions executable in the computing device that, when executed, cause the computing device to:
   communicate with a destination device to determine that a configurable state of the destination device does not satisfy a compliance rule of a management service;
   determine an area of a screen capture to obscure within a video stream based at least in part on the compliance rule of the management service;
   generate the video stream by application of a transformation to the screen capture based at least in part on the compliance rule, wherein the transformation obscures the area within the video stream;
   transmit the video stream to the destination device;
   obtain a user-specified modification to the area of the screen capture to obscure within the video stream; and
   after the video stream is transmitted to the destination device, update the video stream by application of an updated transformation to the screen capture based at least in part on the user-specified modification, wherein the updated transformation obscures an updated area within the video stream based at least in part on the user-specified modification.

2. The system of claim 1, wherein when executed the program instructions further cause the computing device to:
   obtain a user-specified annotation; and
   update the video stream to include the user-specified annotation.

3. The system of claim 1, wherein the area includes an entirety of the screen capture and the user-specified modification defines a user-specified area to permit within the video stream.

4. The system of claim 1, wherein the user-specified modification defines a user-specified area to obscure within the video stream, and the updated area includes the area and the user-specified area.

5. The system of claim 1, wherein the transformation comprises application of an opaque layer over the area based at least in part on the compliance rule.

6. The system of claim 1, wherein the transformation comprises application of a Gaussian blur to the area based at least in part on the compliance rule.

7. The system of claim 1, further comprising a display device of the computing device, and wherein when executed the program instructions further cause the computing device to indicate the area on the display device by application of a translucent layer over the area.

8. A computer-implemented method, comprising:
communicating with a destination device to determine that a configurable state of the destination device does not satisfy a compliance rule of a management service;
determining an area of a screen capture to obscure within a video stream based at least in part on the compliance rule of the management service;
generating the video stream by application of a transformation to the screen capture based at least in part on the compliance rule, wherein the transformation obscures the area within the video stream;
transmitting the video stream to the destination device;
obtaining a user-specified modification to the area of the screen capture to obscure within the video stream; and
updating the video stream by application of an updated transformation to the screen capture based at least in part on the user-specified modification, wherein the updated transformation obscures an updated area within the video stream based at least in part on the user-specified modification.

9. The method of claim 8, further comprising:
obtaining a user-specified annotation; and
updating the video stream to include the user-specified annotation.

10. The method of claim 8, wherein the area includes an entirety of the screen capture and the user-specified modification defines a user-specified area to permit within the video stream.

11. The method of claim 8, wherein the user-specified modification defines a user-specified area to obscure within the video stream, and the updated area includes the area and the user-specified area.

12. The method of claim 8, wherein the transformation comprises application of an opaque layer over the area based at least in part on the compliance rule.

13. The method of claim 8, wherein the transformation comprises application of a Gaussian blur to the area based at least in part on the compliance rule.

14. A non-transitory computer-readable medium embodying program instructions executable in a computing device that, when executed, cause the computing device to:
communicate with a destination device to determine that a configurable state of the destination device does not satisfy a compliance rule of a management service;
determine an area of a screen capture to obscure within a video stream based at least in part on the compliance rule of the management service;
generate the video stream by application of a transformation to the screen capture based at least in part on the compliance rule, wherein the transformation obscures the area within the video stream;
transmit the video stream to the destination device;
obtain a user-specified modification to the area of the screen capture to obscure within the video stream; and
update the video stream by application of an updated transformation to the screen capture based at least in part on the user-specified modification, wherein the updated transformation obscures an updated area within the video stream based at least in part on the user-specified modification.

15. The non-transitory computer-readable medium of claim 14, wherein when executed the program instructions further cause the computing device to:
obtain a user-specified annotation; and
update the video stream to include the user-specified annotation.

16. The non-transitory computer-readable medium of claim 14, wherein the area includes an entirety of the screen capture and the user-specified modification defines a user-specified area to permit within the video stream.

17. The non-transitory computer-readable medium of claim 14, wherein the user-specified modification defines a user-specified area to obscure within the video stream, and the updated area includes the area and the user-specified area.

18. The non-transitory computer-readable medium of claim 14, wherein the transformation comprises application of an opaque layer over the area based at least in part on the compliance rule.

19. The non-transitory computer-readable medium of claim 14, wherein the transformation comprises application of a Gaussian blur to the area based at least in part on the compliance rule.

20. The non-transitory computer-readable medium of claim 14, wherein when executed the program instructions further cause the computing device to indicate the area on a display device of the computing device by application of a translucent layer over the area.

* * * * *